United States Patent
Hwang et al.

(10) Patent No.: US 7,440,524 B2
(45) Date of Patent: Oct. 21, 2008

(54) CHANNEL ESTIMATION IN A WIRELESS TRANSMISSION SYSTEM

(75) Inventors: Ho-chi Hwang, Hsin-Chu (TW); Wei-nan Sun, Hsin-Chu (TW)

(73) Assignee: Mediatek, Inc., Hsin-Chu (TW)

( * ) Notice: Subject to any disclaimer, the term of this patent is extended or adjusted under 35 U.S.C. 154(b) by 780 days.

(21) Appl. No.: 10/217,934

(22) Filed: Aug. 13, 2002

(65) Prior Publication Data

US 2004/0032917 A1 Feb. 19, 2004

(51) Int. Cl.
*H03D 1/00* (2006.01)
*H04L 27/06* (2006.01)

(52) U.S. Cl. .................................. 375/343; 375/224
(58) Field of Classification Search .............. 375/224, 375/316, 340, 343
See application file for complete search history.

(56) References Cited

U.S. PATENT DOCUMENTS

| | | | | |
|---|---|---|---|---|
| 6,002,716 | A * | 12/1999 | Meyer et al. | 375/231 |
| 6,687,290 | B1 * | 2/2004 | Okazaki | 375/226 |
| 6,700,919 | B1 * | 3/2004 | Papasakellariou | 375/130 |
| 6,775,521 | B1 * | 8/2004 | Chen | 455/67.11 |
| 7,027,817 | B2 * | 4/2006 | Jechoux et al. | 455/450 |

OTHER PUBLICATIONS

L.B. Lopes, "Performance of Viterbi Equalisers for the GSM System," Telecommunications, Second IEEE National Conference, pp. 61-66, 1989.

A.S. Khayrallah, et al., "Improved Channel Estimation with Slide Information," Vehicular Technology Conference, IEEE 47th, vol. 2, pp. 1049-1053, 1997.

* cited by examiner

*Primary Examiner*—Jean B Corrielus
(74) *Attorney, Agent, or Firm*—Hogan & Hartson LLP

(57) ABSTRACT

A GSM communication system uses a channel estimator to generate a channel impulse response estimate from received bursts. Preferred embodiments of such a system include a first correlation unit that uses N midamble bits to evaluate received signals and produce first correlation outputs over a wide search range. A positioning unit identifies candidate first correlation outputs having the best estimation quality within a sliding observation window and uses those outputs as the initial channel impulse response (CIR) estimate. The initial CIR is provided to a second correlation unit that block correlates M (greater than N) midamble bits to the received signal samples. The second correlation unit performs correlation stage by stage with compensation based on the initial and updated CIR to improve the channel estimation.

10 Claims, 4 Drawing Sheets

CHANNEL ESTIMATION IN A WIRELESS TRANSMISSION SYSTEM

BACKGROUND

1. Field of the Invention

The present invention relates to a wireless communication system that utilizes an equalizer such as a Viterbi equalizer and more particularly relates to the estimation of channel characteristics for use by such an equalizer.

2. Discussion of the Related Art

Wideband CDMA, one form of direct-sequence code division multiple access (DS/CDMA) transmission system, has been accepted as one of the air interface technologies for UMTS/IMT2000 and the Third Generation Partnership Project (3GPP). Using DS/CDMA techniques can provide wireless and cellular applications the efficient use of available bandwidth, immunity to interference, and adaptability to variable traffic patterns. Because the infrastructure for the new wireless networks that will exploit DS/CDMA will take a long time to develop, second generation wireless communication systems like Global System for Mobile (GSM), United States Digital Cellular (IS-54) and CDMA Digital Cellular Standard (IS-95) continue to play significant roles in wireless communication networks.

GSM is the most popular cellular standard in second generation wireless communication systems. Approximately sixty-five percent of all cellular subscribers in the world receive their primary voice transmission or Internet access from GSM networks. This market penetration alone ensures that GSM will continue to be an important technology. GSM will eventually adopt the WCDMA standard, which provides more frequency bandwidth for voice, data and video transmission. A dual mode transceiver that incorporates both standards to provide smooth migration and backward compatibility, therefore, will be desirable. For all of these reasons, research and development continues on conventional GSM technology and GSM base and mobile stations will continue to be an important market.

GSM utilizes frequency division duplex (FDD) in combination with time division multiple access (TDMA) and frequency hopping multiple access (FHMA) schemes to provide base stations with the capability to simultaneously access and separate multiple users in both the time and frequency domain. The available forward and reverse (or uplink and downlink) frequency bands are divided into 200 KHz wide channels or slots called absolute radio frequency channel numbers (ARFCNs). Each ARFCN identifies a forward and reverse channel pair that is separated in frequency by 45 MHz and each forward channel is time shared between as many as eight subscribers (mobile stations) using TDMA. That is, each of the eight subscribers uses the same ARFCN in the frequency spectrum, while they occupy unique time slots (TS) to avoid interfering with each other.

Each GSM user transmits a burst of data during the time slot assigned to it. GSM defines five specific data burst types, for example, in GSM 05.02. Normal bursts are used for the traffic channel (TCH) and the dedicated control channel (DCCH) transmissions on both the forward and reverse link. Bursts consist of 148 bits which are transmitted at a rate of $13/48*1,000,000$ bits per second together with an unused guard interval of 8.25 bits provided at the end of each burst to avoid interfering with time-adjacent users if there are timing errors. Out of the total 148 bits per time slot, two blocks of 57 information bits are located close to the beginning and end of the burst. The midamble consists of a 26-bit training sequence which is assigned by GSM networks and allows the mobile stations (e.g., handsets) or the base stations to analyze the radio propagation characteristics before demodulating and decoding the transmitted symbols. On either side of the midamble there are control bits called stealing flags used to distinguish whether the time slot contains traffic (TCH) or control (FACCH) data.

One type of receiver for the demodulation of transmitted symbols in the GSM transmission system utilizes a Viterbi equalizer. In GSM and other wireless communication systems information signals to be transmitted are linearly combined due to radio propagation, and at the receiving end, a Viterbi equalizer processes the received signal samples. The Viterbi equalizer demodulates the transmitted symbols according to a process of maximum likelihood sequence estimation. To find a best (i.e., the most probable in view of the received symbols) sequence of transmitted symbols, the Viterbi equalizer needs to estimate the channel and so derive the channel information. Channel information provides a model of the channel and allows prediction of the characteristics of different symbol sequences. The equalizer uses this information to select the most likely transition to each new state by comparing the accumulated path metrics of the two predecessor states plus the so called transition or branch metrics.

Several channel estimation techniques using training sequence data have been proposed. Training sequences are standardized for any given communication system and so provide a known symbol sequence. The simplest channel estimator is based on block correlation. An example of such a simple channel estimator is described in the article, Lopes, "Performance of Viterbi Equalizers for the GSM System," *Second IEEE National Conference on Telecommunications*, pp. 61-66 (1989). That article describes a channel estimation procedure involving essentially the convolution of the received signal with the stored central N bits of the training sequence. The end result of the article's channel estimation process is the channel impulse response (CIR). The accuracy obtained in estimating the channel impulse response through block correlation can be limited since the technique uses a short correlation length and so may be susceptible to additive noise sources. The article, Khayrallah, et al., "Improved Channel Estimation with Side Information," $47^{th}$ *IEEE Conference on Vehicular Technology*, Vol. 2, pp. 1049-53 (1997), describes both a least square (LS) and a constrained least square based channel estimator that better rejects additive noise and so improves the quality of CIR estimation. The described channel estimation processes use matrix inversion, which may require significant computation resources and might have problems due to the word length available in practical implementations.

SUMMARY OF THE PREFERRED EMBODIMENTS

An aspect of the invention provides a receiver for a wireless communication system having a front end receiving an information signal transmitted over a wireless channel. The front end provides a signal output that includes any intersymbol interference introduced by transmission over the wireless channel. An analog to digital converter converts the signal output into a sequence of sample values. A channel estimator estimates a channel impulse response from the sequence of sample values. The channel estimator includes a first correlation unit generating correlation values by correlating N midamble bits with a plurality of the sample values. A positioning unit selects from the correlation values of the first correlation unit L correlation values based on estimation quality of a first channel impulse response (CIR) estimate.

The positioning unit also aligns a set of received signal samples according to the first CIR estimate. A second correlation unit correlates the received signal samples with M midamble bits, M greater than N, and removing at least a portion of correlation effects to produce a second CIR estimate.

BRIEF DESCRIPTION OF THE DRAWINGS

The invention will be further described and explained with reference to the exemplary embodiments illustrated in the drawings, which form a part of this disclosure.

DETAILED DESCRIPTION OF THE PREFERRED EMBODIMENTS

Figure 1:
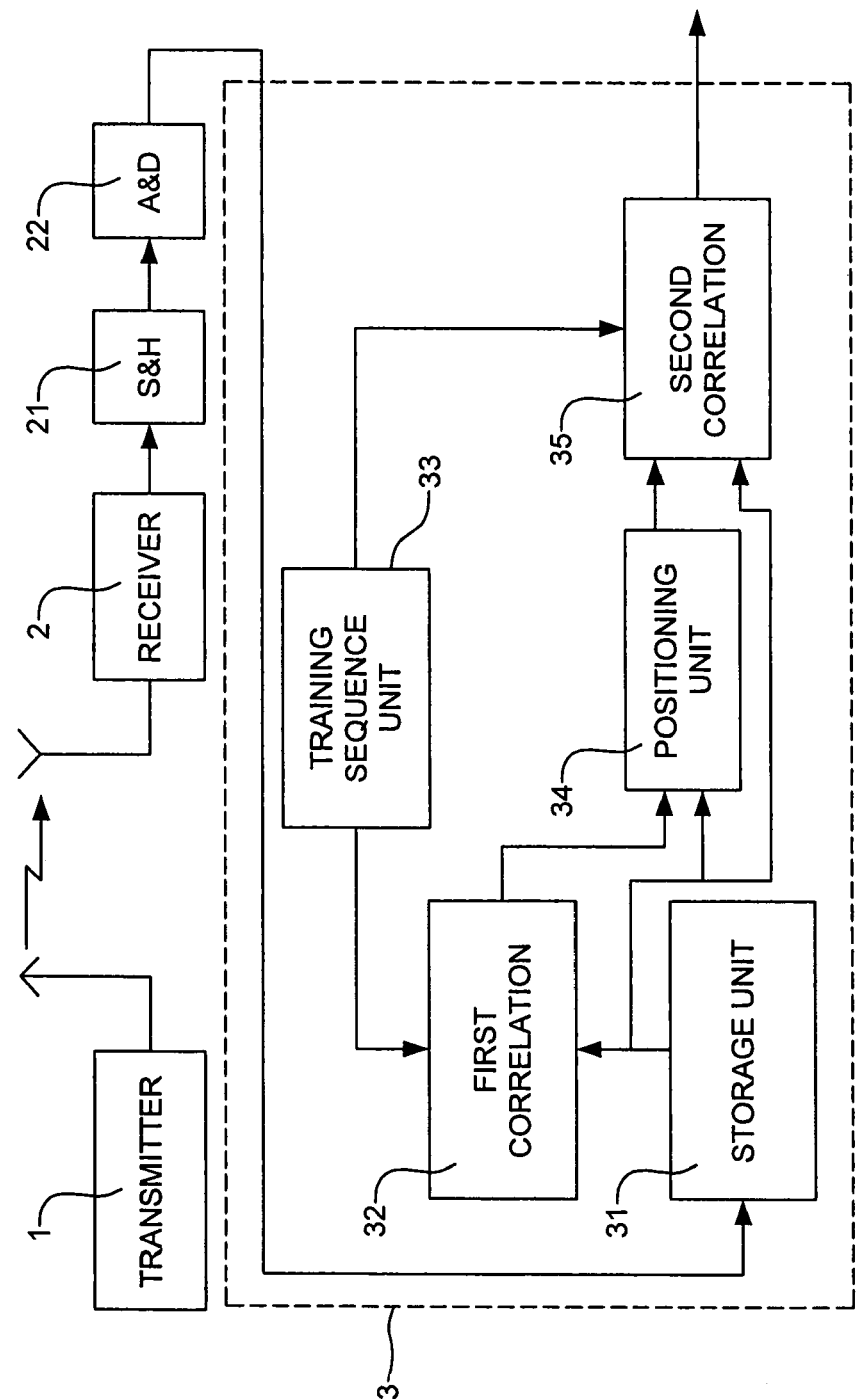
FIG. 1 shows a block diagram of circuitry for estimating a channel impulse response.

Preferred embodiments of the present invention implement a correlation type channel estimator preferably using more than N midamble bits, for example M midamble bits, to improve the quality of channel estimation in comparison to the conventional process that uses only N midamble bits. An embodiment of the present invention might use two kinds of correlation units: a first correlation unit and a multistage second correlation unit. The first correlation unit generates data used to produce an initial channel impulse response (CIR) estimate and that initial estimate is provided to the second correlation unit. The first correlation unit preferably performs block correlation using a block of N midamble bits that is orthogonal to other sequences of the training sequence ("the orthogonality property"). The second correlation unit preferably improves on the initial CIR estimate using additional correlations using a block of length M greater than N. Performing additional correlations with the length M block of midamble bits has the advantage of greater noise rejection but does not generally have orthogonality with respect to the training sequence. Accordingly the second correlation unit preferably uses compensation to reduce the correlation effects caused by the non-orthogonality of the extended, M-bit midamble sequence to obtain a more accurate CIR estimate.

Other preferred embodiments of the present invention preferably provide a GSM communication system that uses a channel estimator to generate a channel impulse response estimate from received bursts. Preferred embodiments of such a system preferably include a first correlation unit that uses N midamble bits to evaluate received signals and produce first correlation outputs over a wide search range. A positioning unit preferably identifies candidate first correlation outputs having the best estimation quality within a sliding observation window and uses those outputs as the initial channel impulse response (CIR) estimate. The positioning unit is connected to the second correlation unit having M (greater than N) center midamble bits to correlate the received signal samples. The second correlation unit preferably performs correlation stage by stage with compensation based on the initial CIR to improve the channel estimation.

Preferred embodiments provide a channel estimator that receives and processes the transmitted symbols through a dispersive transmission channel in a Global System for Mobile (GSM) transmission system. The channel estimator has a storage unit for accumulating received signal samples that are obtained by an analog to digital (A/D) converter from one received burst. An additional storage unit stores the training sequence bits. A first correlation unit performs the correlation between the received samples and the N central (midamble) training sequence bits assigned by the base station. A positioning unit locates the selected channel coefficients and aligns the P received signal samples to the selected CIR. A multistage second correlation unit performs the correlation with M (more than N) midamble bits using a multistage process to eliminate interference introduced by the non-orthogonal property of the extended sequence of training sequence bits. The refined channel coefficients are obtained iteratively and the more accurate channel estimation is output.

The A/D converter may, for example, take the samples of the received signal at the receiving side once for every transmitted symbol interval ($T_b$). The storage unit is a memory that comprises storage for more than P elements of received signal samples within a GSM normal burst. A first correlation unit performs the correlation of these stored signal samples with N central (midamble) training sequence bits stored in the additional storage unit over a wide search window. The positioning unit takes these correlation values from the first correlation unit as inputs and observes the values of estimation quality, each obtained over L of these correlation values within an observation window with a specific shift from the beginning of the observation window, with the L correlation values moved across the window in a sliding way. The positioning unit determines the first CIR estimate having the best estimation quality and the corresponding observation window with a certain sliding shift. Then the positioning unit time-wise aligns the received signal sample to the selected CIR estimate. A multistage second correlation unit takes the first CIR estimate as an input and correlates the received signal samples with M (M greater than N) center (midamble) training sequence bits to eliminate the correlation effects caused by the non-orthogonal property of the extended training sequence.

The GSM standard specifies eight kinds of training sequences to be used for normal burst transmissions. Each of the eight training sequences consists of 26 bits, in which the 16 center bits are orthogonal to any sequence segment of 16 bits, except itself. The commonly used, correlation type channel estimator uses the orthogonality of the training pattern to simply analyze the radio propagation characteristics of the communication channel. This kind of correlation type channel estimator, as illustrated in the article, Lopes, "Performance of Viterbi Equalizers for the GSM System," *Second IEEE National Conference on Telecommunications*, pp. 61-66 (1989), uses N center bits of the training sequence to correlate with the received signal samples over a wide search range in the presence of timing error. The correlator observes the correlation outputs and selects the correlation outputs with the best estimation quality as the channel impulse response (CIR). The so-determined CIR coefficients are used in the equalizer to demodulate the transmitted symbols. In the presence of additive white Gaussian noise (AWGN), the accuracy of this correlation type channel estimation may be degraded, since the correlation length is short.

The article, Khayrallah, et al., "Improved Channel Estimation with Side Information," 47th *IEEE Conference on Vehicular Technology*, Vol. 2, pp. 1049-53 (1997) proposes both least square (LS) and constrained least square based channel estimators to improve the quality of estimation. These estimators often use matrix inversion, which may require large computations and large memories to store the data sets. Additionally, these estimators may introduce quantization errors in real implementations.

Using more than N midamble bits allows a correlation type channel estimator to average out noise effects and so improve the signal-to-noise ratio (SNR) of the CIR estimate. On the other hand, if more than the conventional N midamble bits are used, the extended midamble bit sequence will no longer be orthogonal to the sets of training sequence bits. The extended midamble sequence will be sufficiently orthogonal to provide useful information for estimating the CIR. However, the non-orthogonal property of the training sequence can introduce correlation effects and therefore can increase the error variance. The channel estimator using more than N center midamble bits preferably compensates for the correlation effects due to the non-orthogonal training pattern; otherwise the strategy can only be used at low SNR, where noise variance dominates. The present invention may in some implementations provide a digital channel estimator using more than N center midamble bits to improve the SNR for the CIR estimate. A compensation scheme is proposed that preferably is used in that estimator to reduce the correlation effect caused by the non-orthogonal property of the extended portion of the training sequence used.

FIG. 1 represents a radio transmission system in which the information signals to be transmitted are radiated in the form of bits $d_k$ from a transmitter 1. Due to the free space radio propagation between the transmitter 1 and the receiver front end 2, the transmitted signal is distorted by multipath transmission as a result of reflections and by addition of noise and other interfering signals. In this manner a received signal is linearly superimposed with delayed signal portions of the current and previously transmitted bits (i.e., the multipath contribution) together with the interference signals and noise. To overcome the multipath effect, an adaptive equalizer or maximum likelihood sequence estimator (MLSE) implemented as a Viterbi equalizer is used to demodulate the transmitted symbols. To find the best sequence of transmitted symbols in the MLSE sense, the Viterbi equalizer needs the channel information to select the most likely transition to each new state by comparing the accumulated path metrics of the two predecessor states plus the so called transition (branch) metrics.

Figure 2:
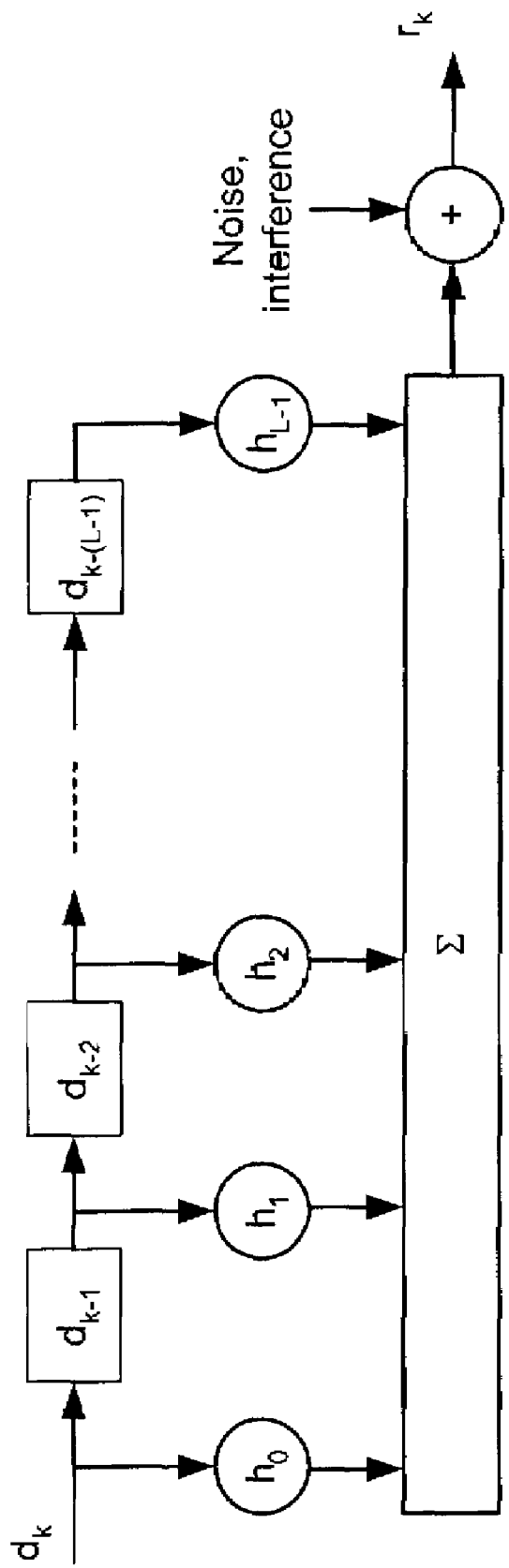
FIG. 2 shows a channel model of a dispersive wireless channel, illustrating the multipath, noise and interference contributions.

The receiver front end 2 (FIG. 1) receives radio waves through a propagation multipath channel and down converts the received signal into the base band signal. The down converted base band signal is sampled by a sample and hold unit 21 and then the analog to digital (A/D) converter 22 digitizes the samples of the received signal waveform. The propagation multipath channel can be modeled as having a channel memory of L, that is, the received signal samples are the superposition of L previously transmitted symbols together with the interference and noise, as shown in FIG. 2. The storage unit 31 (FIG. 1) accumulates the digitized received signal samples corresponding to a single burst.

A first correlation unit 32 determines initial channel impulse responses by correlating the received signal samples stored in the storage unit 31 with the N center midamble bits stored in the training sequence unit 33. In preferred implementations in a GSM communications network, the training sequence will often be one of the eight designated training sequences for normal bursts and the number N will be sixteen. It is of course possible in the future that a different training sequence might be used. In that case, N would typically be chosen to be the largest number within the training sequence that has the orthogonality property. Due to the timing uncertainty caused by the synchronization error, the correlation procedures of the first correlation unit 32 are taken over a wide search range, for example a span of L±W symbols. Therefore, (2W+L) correlation output values are produced by the first correlation unit 32. Each of these correlation values is obtained by correlating N midamble bits with the received signal samples from the different positions in the received burst. To accomplish this, the size of the storage unit 31 is preferably set to exceed (P+2*W) to accumulate the received signal samples for this search window.

The operation of the first correlation unit 32, assuming that the channel has a memory of five, can be modeled as a five-tap FIR (finite impulse response) filter. A transmitted normal burst would include a first data block, a training sequence ($c_0$, $c_1$, $c_2$ ... $c_{23}$, $c_{24}$, $c_{25}$) and a second data block, with the burst symbols modulated for transmission and modulated by the wireless channel before being received.

Some of the (2W+L) correlation values provide information useful to CIR estimation. Others of the (2W+L) correlation values differ from zero only because of the residual error caused by noise and non-ideal effects, for example, the memory of the multipath propagation channel exceeding the nominal value L. The positioning unit 34 observes the correlation values from the first correlation unit 32 and calculates several values of estimation quality, each obtained over L correlation values within successive sliding windows. Various measures of estimation quality might be used including, for example, the sum of the squares of the differences between the received symbol values and the estimated symbol values. The lowest sum is selected as the best estimate. The L correlation values having the best estimation quality are selected as the initial CIR estimate and the corresponding observation window is determined. Then the positioning unit 34 identifies the P received signal samples in the storage unit 31 that are aligned with the first CIR estimate.

Figure 3:
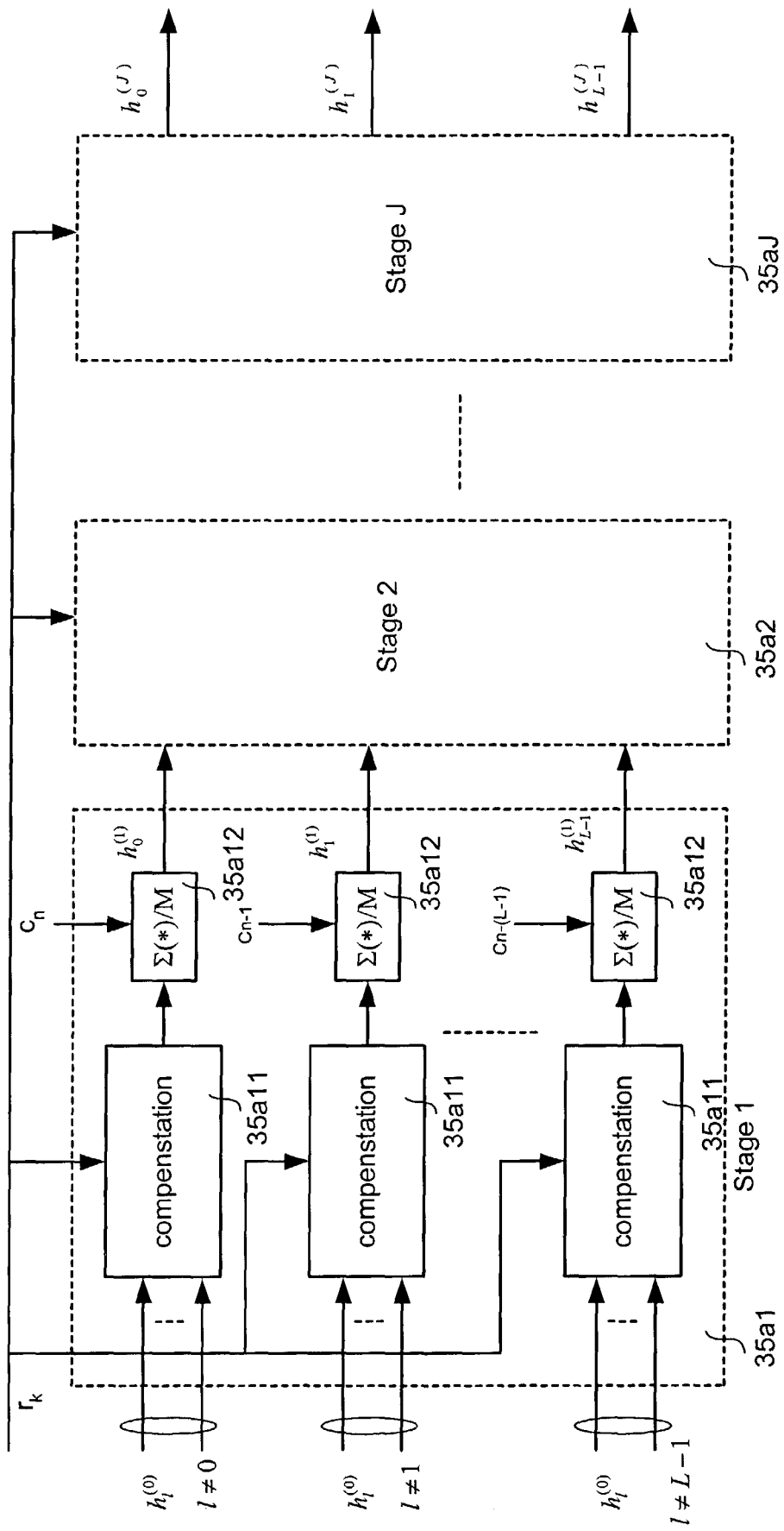
FIG. 3 shows a block diagram of a multistage second correlation unit with compensation.

A second correlation unit 35, which may have a structure like that illustrated in FIG. 3, then correlates the received signal samples with M midamble bits, in which M is larger than N, to iteratively refine the CIR estimate through successive compensation and estimation stages. For example, the M midamble bits might be selected as the central 22 bits of the GSM training pattern selected by the base station. As shown in FIG. 3, there may be J successive stages, with each stage having the same structure. It will be appreciated that the illustrated structure is particularly well suited to be implemented in a digital signal processor (DSP). This is true of other parts of the receiver, as well. The first CIR estimate $h_0^{(0)}$, $h_1^{(0)}$, ..., $h_{L-1}^{(0)}$, as determined from the first correlation unit 32 after positioning, is provided to the input of the first stage 35a1 (FIG. 3) of the second correlation unit 35. For a specific tap of the CIR, for example $h_1$, the signals that are contributed from the other taps of the CIR are reconstructed and then subtracted out from the received signal samples. This is accomplished in the compensation unit 35a11 corresponding to that tap. The now "cleaner" signal samples are then correlated with the M midamble bits to produce a more accurate estimation of $h_1$. The correlation for each tap is performed in the correlator 35a12 corresponding to that tap. The new estimate of the CIR is then output, either to the Viterbi equalizer or to the next stage of the second correlator. The same procedures are taken on the other taps of the CIR with the calculations for the various taps preferably done in parallel to the extent practical. After the more accurate estimation is done at this current stage, for example stage j, the same procedures are taken at the next stage (j+1) with a refined CIR estimate obtained at stage n until stage J is completed. The number of stages used is generally selected by balancing the computational delay introduced by each stage with the gain provided. A practical implementation might, for example, use two stages in the second correlation unit. On the other hand, use of even a single stage within the second correlation unit can provide a gain in excess of 0.3-0.4 dB. Then the second correlation unit provides the final CIR estimate as the channel information to the Viterbi equalizer.

Figure 4:
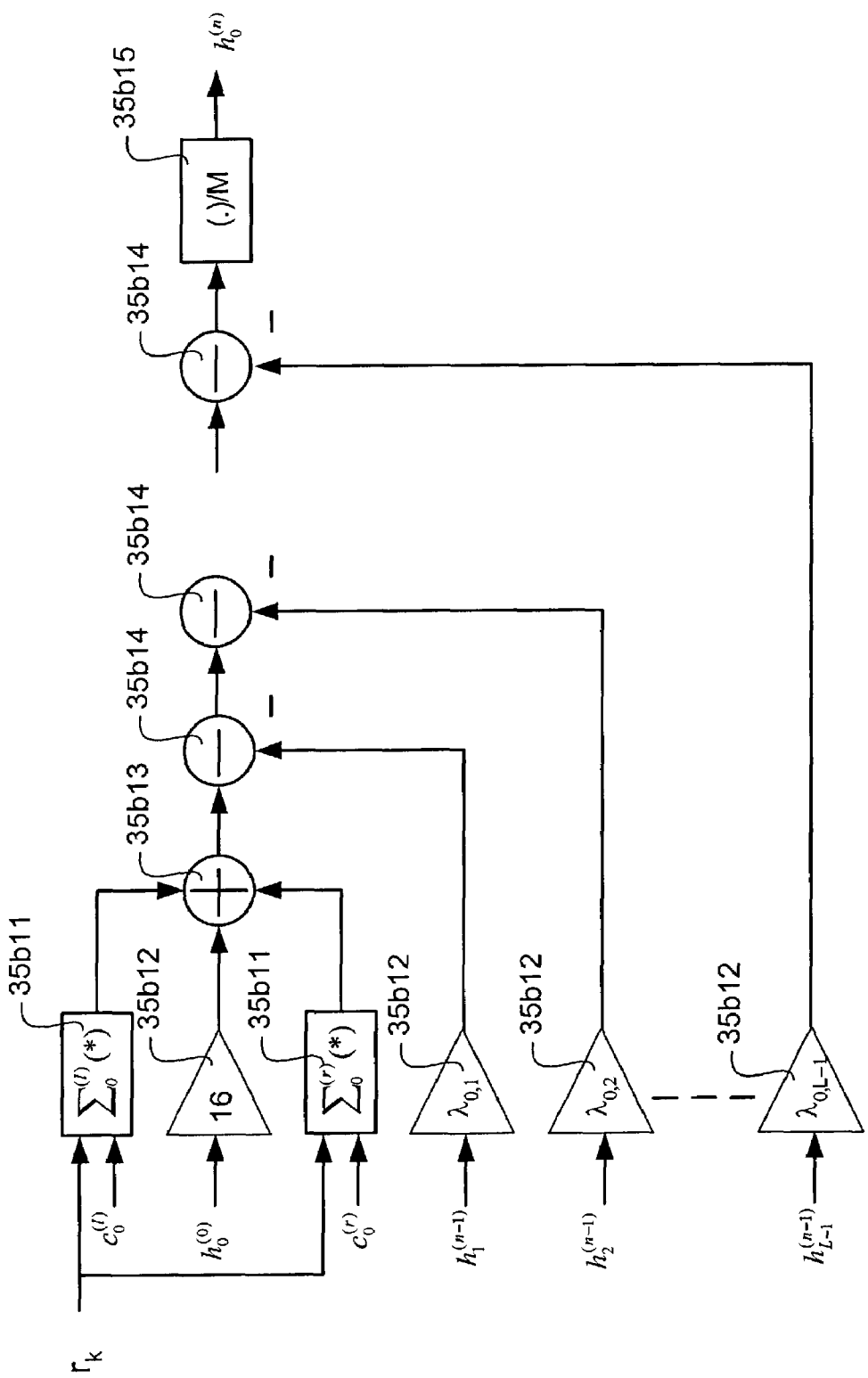
FIG. 4 shows a block diagram of an alternate implementation of a second correlation unit.

An alternative implementation method is presented in FIG. 4 that reduces complexity of the second correlation unit and saves computing time. The strategy underlying the FIG. 4 implementation is that it is not necessary to correlate the entire M-bit sequence with the received signal samples in a second correlation stage because the initial CIR estimate from a first correlation unit already exists. That is, the first correlation unit calculates the correlation for the N midamble bits so that the second correlation unit only calculates the correlations for the (M−N)/2 bits on either side of the N midamble bits. For example, a first correlation unit at stage n is presently estimating $h_0$, so that calculation need not be performed again. The correlation for the whole M received signal samples can be divided into three parts: the left part up to the N center midamble bits, the N center midamble bits and the right part following the N center midamble bits. The correlation results for the N center midamble bits are always available from the calculations of the first correlation unit and are provided to element 35$b$12. Only the left and right parts need to be calculated for the correlation. Elements 35$b$11 respectively calculate the left and right parts, which are combined at element 35$b$13. To compensate for the correlation effects, a compensation term is determined from each of the other taps in elements 35$b$12 and subtracted out from the correlation value at elements 35$b$14. The compensation term is simply the product of the estimated CIR obtained from the previous stage and a constant (35$b$15). FIG. 4 illustrates the alternative second correlation unit for $h_0$ at stage n.

The present invention has been described in terms of certain preferred embodiments thereof. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

We claim:

1. A receiver for a wireless communication system comprising:
    a front end receiving an information signal transmitted over a wireless channel, the front end providing a signal output that includes any intersymbol interference introduced by transmission over the wireless channel;
    an analog to digital converter converting the signal output into a sequence of sample values; and
    a channel estimator that estimates a channel impulse response from the sequence of sample values,
    the channel estimator comprising:
    a first correlation unit generating correlation values by correlating N midamble bits with a plurality of the sample values,
    a positioning unit that selects from the correlation values of the first correlation unit L correlation values based on estimation quality of a first channel impulse response (CIR) estimate, the positioning unit aligning a set of received signal samples according to the first CIR estimate, and
    a second correlation unit correlating the set of received signal samples with M midamble bits, M greater than N, wherein the N and M midamble bits are derived from a plurality of known pilot bits and wherein the M midamble bits have a non-orthogonality property in a second correlation process performed by the second correlation unit so that the second correlation process introduces correlation effects, and the second correlation unit removing at least a portion of the correlation effects to produce a second CIR estimate.

2. The receiver of claim 1, wherein the second correlation unit functions iteratively to successively correct for non-orthogonality effects and successively perform correlations between the received signal samples with the M midamble bits.

3. The receiver of claim 1, wherein the second correlation unit provides one or more stages of CIR estimation.

4. The receiver of claim 1, wherein the second correlation unit provides two or more stages of iterative CIR estimation, with the second CIR estimate provided to a second stage of iterative CIR estimation within the second correlation unit.

5. The receiver of claim 3, wherein the second correlation unit comprises:
    L taps, each tap representing one signal component from a communication channel having a channel memory of L, each corresponding one of the L taps coupled to a corresponding reconstruction element, each of the corresponding reconstruction elements calculating an interference signal representing signal contributions from the L-1 taps other than the corresponding tap and subtracting that interference signal from a signal provided to the corresponding tap to compensate the signal; and
    L correlators, each coupled to one of the L taps to receive the compensated signal from the corresponding tap and correlating the compensated signal with the M midamble bits,
    the L correlators generating the second CIR estimate.

6. The receiver of claim 5, wherein the L correlators scale a correlation value and output a component of the second CIR estimate.

7. The receiver of claim 5, wherein one symbol from the communication channel is a superposition of L previously transmitted symbols.

8. The receiver of claim 1, wherein the second correlation unit, for each estimation of a tap of a L-tap channel, correlates the set of received signal samples in left and right parts to provide left and right correlation values and receives a previous N midamble value derived from correlating the N midamble bits for each estimation of a tap and sums the left and right correlation values and the previous N midamble value.

9. The receiver of claim 8, further comprising a subtracting unit for subtracting out a value proportional to estimates of interference signal from other taps.

10. A receiver for a wireless communication system comprising:
    a front end receiving an information signal transmitted over a wireless channel, the front end providing a signal output that includes any intersymbol interference introduced by transmission over the wireless channel;
    an analog to digital converter converting the signal output into a sequence of sample values; and
    a channel estimator that estimates a channel impulse response from the sequence of sample values using a fixed channel memory, the channel estimator comprising:
    a first correlation unit generating correlation values by correlating N midamble bits with a plurality of the sample values, a positioning unit that selects from the correlation values of the first correlation unit L correlation values based on estimation quality of a first channel impulse response (CIR) estimate, the positioning unit aligning a set of received signal samples according to the first CIR estimate, and a second correlation unit correlating the set of received signal samples with M midamble bits, M greater than N, wherein the N and M midamble bits are derived from a plurality of known pilot bits and wherein the M midamble bits have a non-orthogonality property with respect to training sequences for the wireless communication system so that the second correlation process introduces non-orthogonal correlation effects, and the second correlation unit removing at least a portion of the correlation effects to produce a second CIR estimate.

* * * * *